United States Patent

[11] 3,580,365

| [72] | Inventor | Ludwik S. Bialkowski<br>Troy, Ohio |
|---|---|---|
| [21] | Appl. No. | 825,717 |
| [22] | Filed | May 19, 1969 |
| [45] | Patented | May 25, 1971 |
| [73] | Assignee | The B. F. Goodrich Company<br>New York, N.Y. |

[54] AUTOMATIC ADJUSTMENT MECHANISM PARTICULARLY FOR BRAKES
8 Claims, 3 Drawing Figs.

[52] U.S. Cl. .................................................. 188/196P,
                                                        188/71.8
[51] Int. Cl. ..................................................F16d 65/54,
                                                        F16d 55/18
[50] Field of Search............................................ 188/71.8,
                                                        71.9, 196 (PR)

[56] References Cited
UNITED STATES PATENTS

| 1,825,555 | 9/1931 | Stern | 188/196(R)X |
|---|---|---|---|
| 3,338,353 | 8/1967 | Lucien | 188/196(P) |
| 3,467,226 | 9/1969 | Belart | 188/196(P) |

*Primary Examiner*—Duane A. Reger
*Attorneys*—John D. Haney and Harold S. Meyer

ABSTRACT: A brake retractor assembly in which the automatic adjustment mechanism has a plurality of leaf springs in slidable engagement with the retractor rod and a spring engaging member on the rod is disposed so that sliding movement does not occur during retraction of the braking members and limited sliding movement does occur during actuation of the brake providing positive adjustment of the brake to compensate for wear and other changes.

PATENTED MAY 25 1971 3,580,365
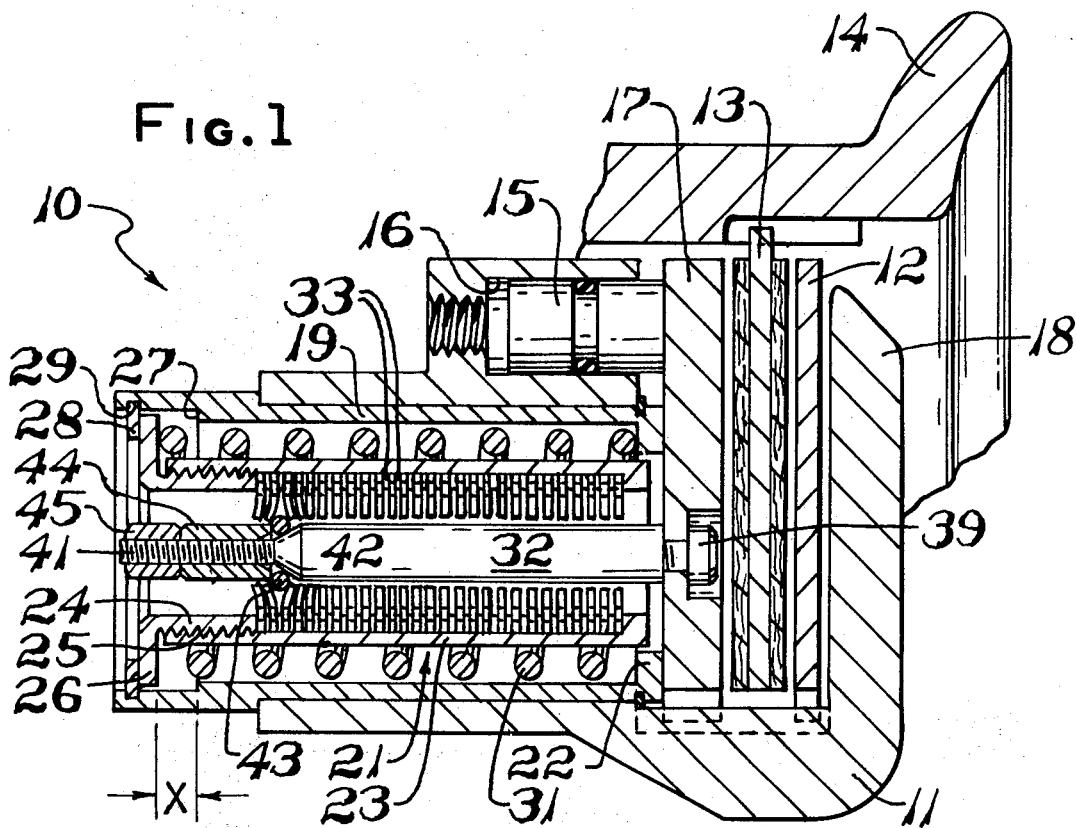
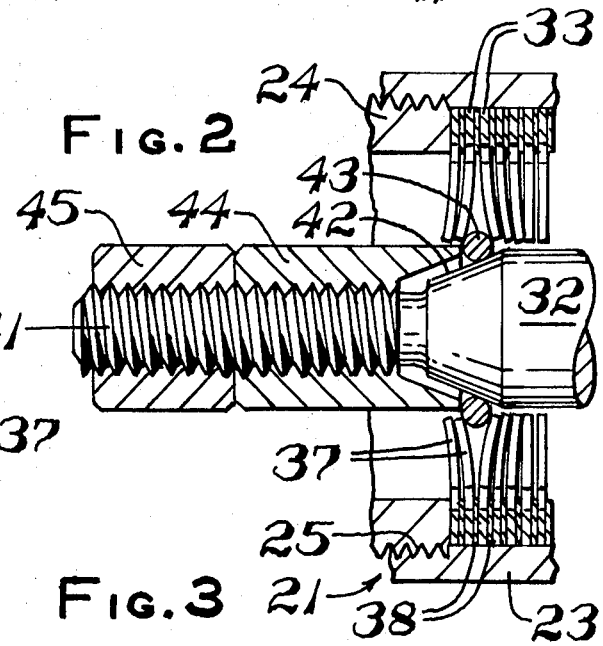
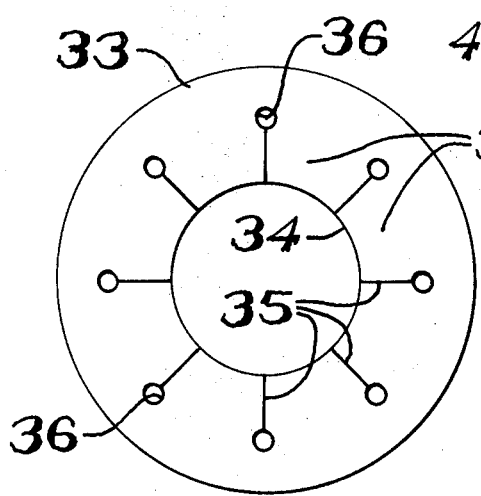
INVENTOR.
LUDWIK S. BIALKOWSKI
BY John D. Haney
ATTY.

AUTOMATIC ADJUSTMENT MECHANISM PARTICULARLY FOR BRAKES

BACKGROUND OF THE INVENTION

This invention relates to mechanism for automatically maintaining a uniform release clearance (and therefore a uniform actuating stroke) for brakes and similar equipment. Mechanisms of this class are commonly used in brake systems to compensate for wear of the brake linings and other brake parts and are popularly called "automatic brake adjusters." Although the present invention is explained here in connection with brakes, the mechanism has utility in other environments where similar wear compensation control is needed such as in clutches, machine tool feeds and the like.

For more than 50 years, designs for brake adjusters or wear-compensators have been of two basic types, namely, (a) mechanical adjusters embodying special ratchets or friction dragging parts such as collets to control the adjustment, and (b) hydraulic adjusters in which adjustment is effected by metering the hydraulic fluid of the system in special ways. By far the most common adjusters used or proposed have been the mechanical types because they are usually much more simple and less expensive than the hydraulic types. The hydraulic adjusters ordinarily depend on one or more valves contained within them for satisfactory operation, and their functional characteristics can be impaired by heating or cooling of the hydraulic fluid, variable seal drag, erratic spring loads, etc. A sophisticated form of hydraulic adjuster which more or less avoids these problems is described, for example, in U.S. Pat. No. 2,926,498, but is obviously a complicated and expensive device.

Ratchet adjusters have a fundamental disadvantage in that they ordinarily provide relatively large incremental adjustments and they cannot easily be reset. For example, see the construction shown in U.S. Pat. No. 1,825,555. To avoid large incremental or step-by-step adjustments, various friction-type devices have been proposed with either use collets, or which work like collets to effect adjustment by friction drag. Typical adjusters of this type are shown in U.S. Pat. No. 2,392,970 and U.S. Pat. No. 3,091,310 which are among the hundreds of prior patents on this type of adjuster. Friction devices are inherently unreliable, however, because the friction drag they exert can be radically altered by many different environmental factors which cannot practically be controlled in an installation to insure functional reliability. In an aircraft brake, for example, vibration, dust, oil, water, rust, or temperature in any combination will radically change the performance characteristics of a friction-type adjuster.

SUMMARY OF THE INVENTION

The adjuster of this invention provides for a simple, positive mechanical adjustment over a practically continuous operating range without reliance on friction effects. It may be rationally designed for the required operating loads and will operate much more reliably under service conditions than the friction or ratchet-type adjusters of the prior art. It is no more expensive than prior mechanical adjusters and indeed may be even less expensive for corresponding sizes. It is practically insensitive to vibration, dirt, oil, and other environmental conditions and can be designed for the required temperature ranges. Another feature of this invention is that the forces required to operate the adjuster are the same in either direction.

The accompanying drawings show one preferred form of brake assembly made in accordance with and embodying this invention and which is representative of how this invention may be practiced.

BRIEF DESCRIPTION OF THE DRAWINGS

In the drawings:

FIG. 1 is a longitudinal cross section of the retractor spring assembly installed in a typical disc brake, the assembly being in the condition its parts occupy when the brake is released, the brake parts being shown in generalized or somewhat schematic form.

FIG. 2 is an enlarged longitudinal cross-sectional view showing the spring members of the adjusting mechanism and their relation to the rod.

FIG. 3 is a view along the line 3-3 of FIG. 1.

DETAILED DESCRIPTION

A retractor spring assembly 10 is mounted rigidly in a torque frame 11 of a brake, the frame in turn being adapted for mounting to a vehicle structure (not shown). The torque frame 11 carries a splined disc 12 in parallel axial alignment with a rotatable lining carrier 13. The latter is in splined engagement at its outer periphery with a rotary member 14 which may be part of the wheel structure with which the brake is associated.

To operate the brake, a hydraulic piston 15 mounted in a cylinder 16 in the brake frame 11 is adapted for displacement in response to hydraulic pressure to urge a pressure plate 17 (splined to frame 11) against lining carrier 13 and thereby force it into frictional engagement with the brake disc 12 and the adjacent reaction plate 18 of the torque frame. The brake parts as shown in FIG. 1 are in the released condition with the splined brake disc 12 and pressure plate 17 out of engagement with the lining carrier 13.

The retractor spring assembly 10 includes a cup-shaped metal body 19 adapted for tight anchorage inside the brake frame 11. Extending axially of the body 19 and contained therein is an adjusting mechanism 21 which is supported for reciprocation by an annular flange 22 at the brake end of the body. The adjusting mechanism 21 has a housing member 23 which may be in slidable engagement with the flange 22. At the opposite end of the housing a sleeve 24 is secured to the inner face of the housing 23 as by screw threads 25. The sleeve 24 extends beyond the end of housing 23 and has a radially extending flange 26 for limiting the axial movement of the adjusting mechanism 21 through engagement with a shoulder 27 of an undercut portion of the body 19 and a spring-loaded retaining ring 28 set in a groove 29 in the body 19. The axial distance is predetermined by the spacing indicated by the letter "X" in FIG. 1 between the surface of the shoulder 27 and the surface of the ring 28 which engages the flange 26. A helical-coiled retractor spring 31 is housed inside the body 19 concentrically surrounding the housing 23 of the adjusting mechanism 21. The spring 31 is caged under compression in the body with the right end coil of the spring (as viewed in FIG. 1) bearing against the inner end wall of the flange 22 of the body 19 and the left end coil bearing against the housing flange 26.

The adjusting mechanism 21 has a plurality of spring members such as spring washers 33 mounted in spaced-apart positions axially of the housing 23. Each of the spring washers 33 extends from the housing 23 radially inward to a central aperture 34 through which extends a cylindrical retractor rod 32. The construction of the spring washers 33 is shown in greater detail in FIGS. 2 and 3. Each of the spring washers 33 has slots 35 extending radially outward from the aperture 34 to stress-relieving holes 36 at positions spaced from the outer periphery of the washer. Sectors 37 between the slots 35 act as left springs having a cantilever mounting at the outer periphery of the washer. The spring washers 33 are spaced apart by spacing washers 38 which have the same outer diameter as the spring washers but have a larger inner diameter so as not to interfere with the leaf spring action of the spring sectors 37. The spring washers 33 an spacing washers 38 are stacked within the housing 23 and held firmly between the flange 22 of the housing and sleeve 24. In the preferred embodiment, the spring washers are of steel and have a thickness of around 0.015 inches. The spacing washers 38 may also be of steel and have a thickness of 0.006 inches. It is understood that the spring washers 33 may be of any suitable spring material and the thickness of the spring washers may be varied to accommodate different braking conditions. The spacing washers 38 may also be of different materials and of different thicknesses depending upon the adjustment desired.

The right end of the rod 32 (as viewed in FIG. 1) projects out through the flange 22 of the body 19 and is fastened tightly to pressure plate 17 by a screw 39. The opposite end of the rod 32 has a threaded screw portion 41 of a reduced diameter which is connected to the main portion of the rod by a tapered section 42. A projecting ring 43 for engaging the spring washer 33 is disposed around the tapered section 42 and held in place by nut 44 and jam nuts 45 threaded on the threaded screw portion 41 of the rod 32.

The ring 43 has an inner diameter less than the diameter of the main section of the rod 32 so that it may be held in clamping engagement between the nut 44 and the surface of the tapered section 42. The outer diameter of the ring 43 is greater than the diameter of the main section of the rod 32 and also greater than the diameter of the aperture 34 in each of the spring washers 33. Accordingly, there is engagement of the ring 43 with the spring washers 33 as shown in FIG. 1 and in more detail in FIG. 2. It is understood that the dimensions of the ring 43 may be changed to provide a greater or lesser resistance to slidable movement of the spring washers relative to the rod 32. It is also contemplated that more than one ring 43 may be disposed at spaced-apart positions along the rod 32 for engagement with the spring washers 33.

In the released condition of the brake as shown in FIG. 1, the flange 26 of the adjusting mechanism 21 is pressed against the surface of ring 28 in the body 19 to provide a positive retracted position of the housing member 23 and adjusting mechanism 21. The spring washers 33 are also in a positive retracted position and engage the ring 43 mounted on the rod 32 to hold it and the attached pressure plate 17 in a positive retracted position.

When the brake is operated by communicating hydraulic fluid to piston 15 and the later displaces the pressure plate 17 towards the lining carrier 13, splined disc 12 and reaction plate 18, the rod 32 is pulled axially through the flange 22 of body 19. The adjusting mechanism 21 including the housing 23 is pulled in the same direction overcoming the forces of the retracting spring 31 and moving the adjusting mechanism until flange 26 engages the shoulder 27 of body 19. Should there be no appreciable wear or other condition materially changing the release clearance between the friction members 12, 13, etc. while these members are engaged, then rod 32 will not be axially displaced an amount sufficient to cause any relative change in the position of the rod within the adjusting mechanism 21.

The mechanism is designed so that the dimension designated by "X" in FIG. 1 is the distance between the shoulder 27 and the ring 28 less the thickness of flange 26 and is equal to the maximum allowable release clearance between the pressure plate 17 and the adjoining braking members 12 and 13. So long as the release clearance does not exceed an amount indicated by dimension "X," the position of the ring 43 between the spring washers 33 will remain the same and the brake members may be engaged and released repeatedly.

Owing to the erosion of the brake lining as the brake is used, the release clearance between the retracted position of the pressure member 17 and the adjoining brake members tends to increase progressively. The existence of this condition is automatically sensed in this mechanism because rod 32 and pressure plate 17 can be displaced for whatever distance that is necessary to bring about brake engagement regardless of wear. Accordingly, whenever the pressure plate 17 and rod 32 are moved through a distance greater than that equal to dimension "X" in order to engage the brake members 12 and 13, the ring 43 will be forced against the spring washers 33 and moved past some of the washers into engagement with others as the actuating force of the brake overcomes the resilient spring force of the spring washers 33 and moves the rod 32 to a new position relative to the adjusting mechanism 21.

On the subsequent release of fluid pressure against the piston 15, the retraction forces on the brake members will act to move rod 32 in the reverse direction and the forces of the retractor spring 31 against flange 26 will return the adjusting mechanism 21 to the fully retracted position. Accordingly, the rod 32 will return the pressure plate 17 to a retracted position and since the retraction stroke is limited by the distance flange 26 and the entire adjusting mechanism 21 can move, the rod 32 is retracted only a distance equivalent to dimension "X" and therefore a new starting position is established for rod 32 and the pressure plate 17 in which the release clearance between the pressure plate and the friction brake members 12 and 13 is again equal to dimension "X."

The progressive relocation of the starting position of the rod 32 and the pressure plate 17 in this manner does not change the maximum deflection amplitude of the retracting spring 31. The retractor spring deflection amplitude remains substantially the same on every actuation from the time the brake is new until the lining is entirely worn out.

When the brake is released there is no source of force, ordinarily, tending to urge the rod 32 toward the braking members as shown in FIG. 1 and the grip of the spring washers 33 on the ring 43 is adequate to maintain the rod 32 in any adjusted position. To reline the brakes, the position of the rod 32 may be reset by merely pushing the pressure plate 17 to the left (as shown in FIG. 1). When such force is applied axially of the rod 32, the resilient resistance force of the spring washers 33 is overcome and the rod may be moved to any new position. It should be noted that at any position the holding force of the spring washers 33 against the ring 43 is constant and is not affected by water, direct, oil, dust and other contaminating substances which ordinarily affect a friction-type adjuster.

Depending on the size of the brake, one or a number of these retractor assemblies may be used in axially-spaced positions in the torque frame.

I claim:

1. An adjuster assembly for regulating the release clearance between two selectively engageable parts such as friction brake or clutch parts to compensate for wear in such parts, the adjuster assembly being characterized by a movable member (32) adapted for axial displacement in response to actuation and release movement of its associated engageable parts; a series of mutually independent, laterally separated springs (33, 37) each directed toward said movable member; means (43) for engaging said movable member with one spring of said series independently of the other springs; means (23, 24) supporting said series of springs for limited axial movement with the corresponding movement of said movable member resulting from said engagement of the movable member with one of said springs; and means (26, 27) for arresting such axial movement of said series of springs so that said movable member is adapted for further displacement relative to said series of springs by deflection of the spring with which the movable member is initially engaged and progressive successive engagement with the next adjoining spring of such series.

2. An assembly according to claim 1 in which each spring of said series includes at least one leaf-type resilient member (37) directed toward said movable member and deflectable in the direction of the displacement movement of said movable member (32).

3. An assembly according to claim 1 in which each spring of said series is in the form of an annulus (33) encircling said movable member (32) substantially normal to the displacement direction of said movable member, with the regions of said annulus (33) near said movable member including a plurality of resilient deflectable portions (37).

4. An assembly according to claim 3 in which each spring of said series is in the form of a thin flat metal annulus, the radially inner region of which is subdivided into a group of sector-shaped leaves which are resiliently deflectable relative to the radially outer region of the annulus.

5. An assembly according to claim 3 in which spacers (38) laterally separate said spring annuli (33) one from another in the displacement direction of said movable member to provide for progressive successive engagement of each said spring annulus by said spring-engaging means (42) on said movable member (32).

6. An assembly according to claim 3 in which tubular cup members (24, 25) support said series of separate spring annuli (33) encircling said movable member (32), and means (31, 22, 26) for biasing said cup members in a direction opposite to the direction in which said movable member is displaced during an actuation movement of the movable member.

7. An assembly according to claim 6 and further including a housing (19) adapted for attachment to a nonmovable member of an associated brake or clutch structure, for maintaining said tubular cup members (24, 25) and said biasing means (31, 22, 26) and said series of springs in their operative location relative to said movable member (32); and a stop (27) in said housing (19) engageable with a portion of said biasing means (26) for limiting the range through which said series of springs is displaceable with said movable member (32).

8. An assembly according to claim 1 and further including means (42, 41, 44) for regulating the position of said spring-engaging means (43) on said movable member relative to the spring of said series with which said means (43) is engaged, thereby regulating the deflecting force exerted on such engaged spring.